F. O. KILGORE.
FLUID TRANSMISSION.
APPLICATION FILED OCT. 22, 1912.

1,203,745.

Patented Nov. 7, 1916.
3 SHEETS—SHEET 1.

Witnesses:
M. S. Crozier,
J. Murphy.

Inventor:
Frederick O. Kilgore
by Jas. H. Churchill
Atty.

F. O. KILGORE.
FLUID TRANSMISSION.
APPLICATION FILED OCT. 22, 1912.

1,203,745.

Patented Nov. 7, 1916.
3 SHEETS—SHEET 2.

Witnesses:
M. S. Crozier
J. Murphy

Inventor,
Frederick O. Kilgore
by Jas. H. Churchill
Atty.

F. O. KILGORE.
FLUID TRANSMISSION.
APPLICATION FILED OCT. 22, 1912.

1,203,745.

Patented Nov. 7, 1916.
3 SHEETS—SHEET 3.

Witnesses:
M. G. Crozier
J. Murphy

Inventor,
Frederick O. Kilgore
by Jas. H. Churchill
atty.

UNITED STATES PATENT OFFICE.

FREDERICK O. KILGORE, OF SOMERVILLE, MASSACHUSETTS.

FLUID TRANSMISSION.

1,203,745.   Specification of Letters Patent.   Patented Nov. 7, 1916.

Application filed October 22, 1912. Serial No. 727,156.

*To all whom it may concern:*

Be it known that I, FREDERICK O. KILGORE, a citizen of the United States, residing in Somerville, county of Middlesex, and State of Massachusetts, have invented an Improvement in Fluid Transmission, of which the following description, in connection with the accompanying drawings, is a specification, like letters on the drawings representing like parts.

This invention relates to mechanism for transmitting motion from a driving shaft to a driven shaft by means of a body of fluid, preferably oil, and is especially applicable for use in automobiles and like vehicles.

The mechanism will be referred to hereinafter as a fluid transmission, by means of which the shaft of the engine or motor may be coupled to the driven shaft, so that the latter may be driven at different speeds and in different directions.

In accordance with this invention I employ a body of fluid such as oil, which is set in motion by a driving member connected with the shaft of the engine or motor, and is caused to act on a driven member connected with the shaft to be driven. Provision is made for causing the body of fluid to be set in motion slowly, when it is desired to start the driven member in motion, and for gradually increasing the speed of the driven member until the latter is rotating at the desired speed.

These and other features of this invention will be pointed out in the claims at the end of this specification.

Figure 1:
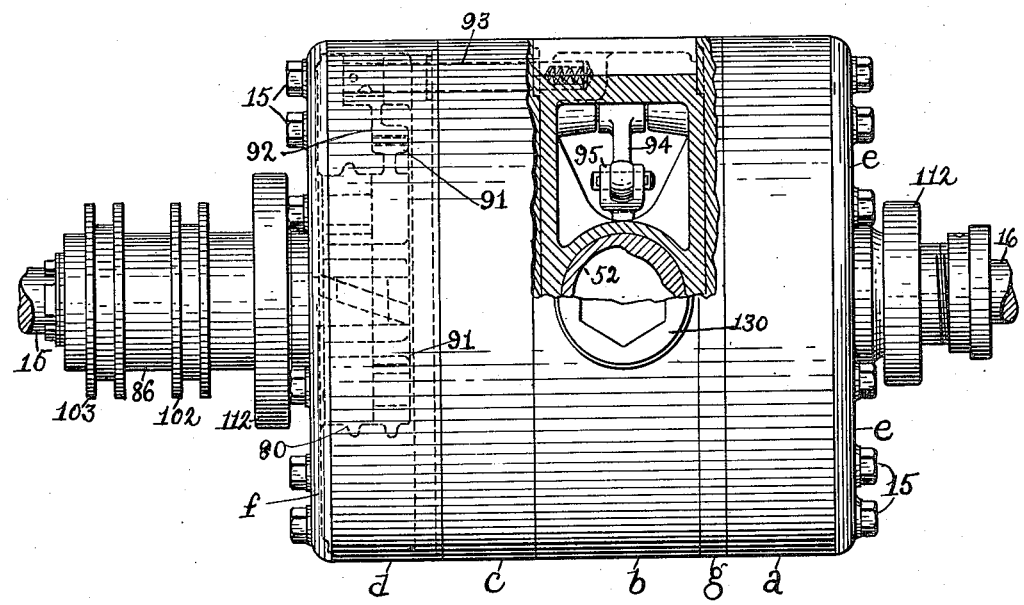
Figure 2:
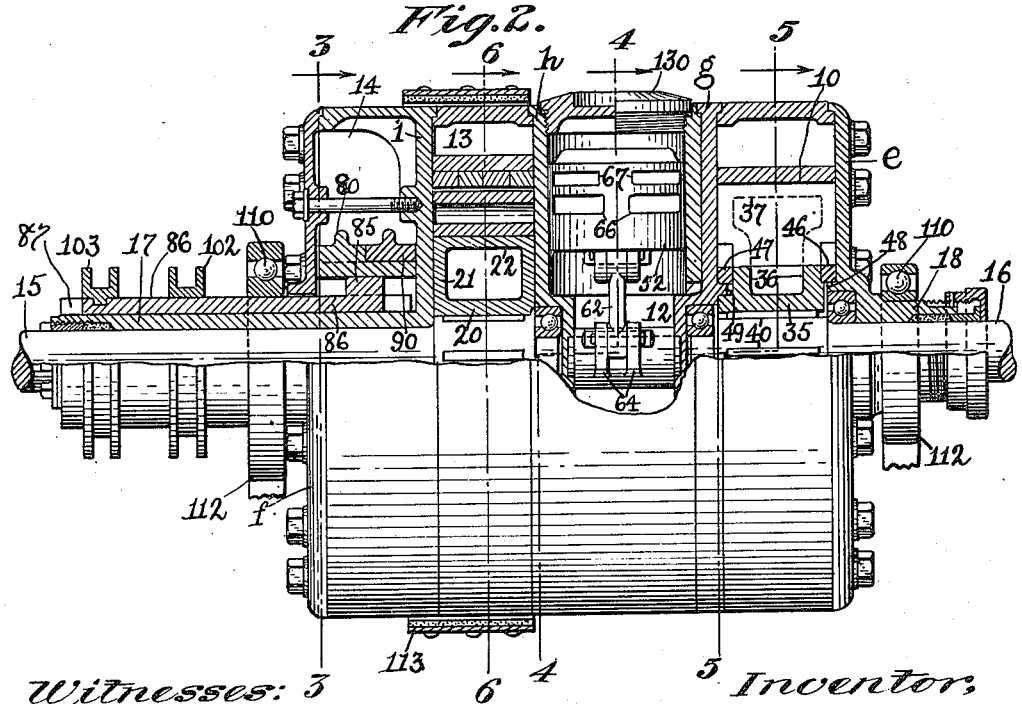
Figure 3:
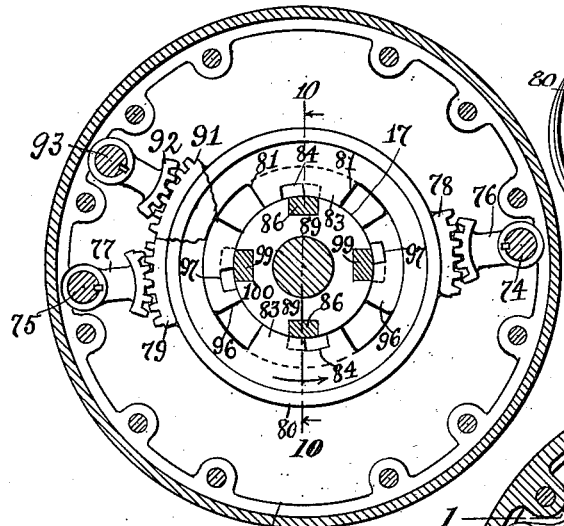
Figure 4:
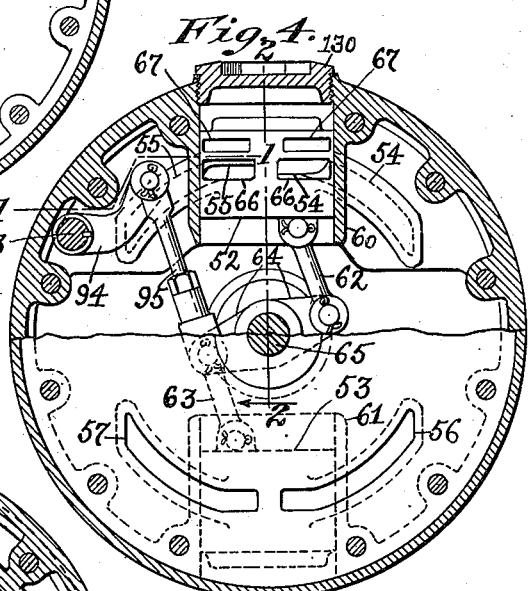
Figure 5:
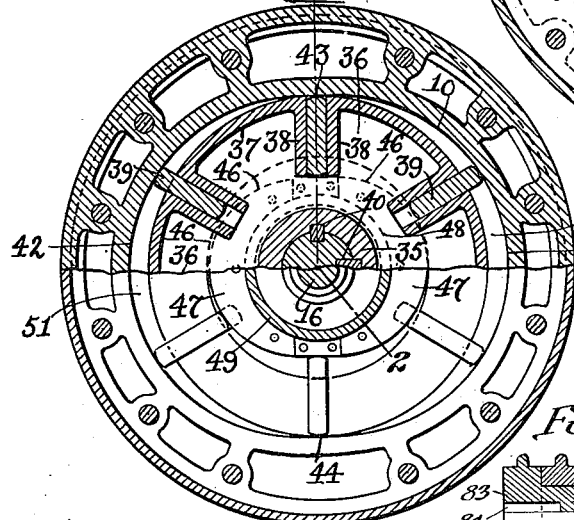
Figure 6:
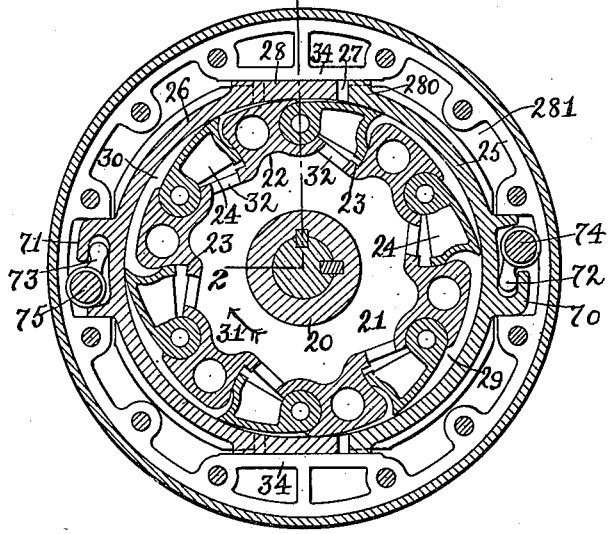
Figure 7:
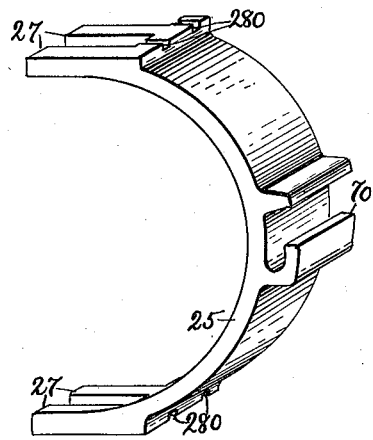
Figure 8:
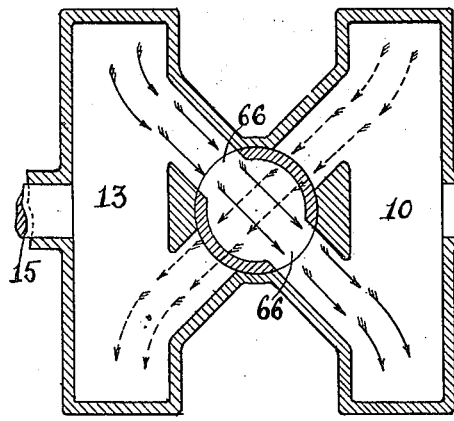
Figure 9:
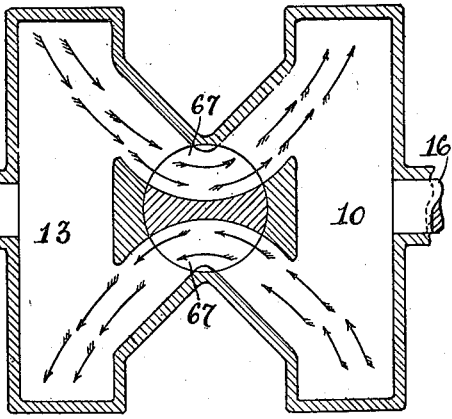

Figure 1 is a front elevation of one form of fluid transmitting mechanism embodying this invention. Fig. 2, a partial elevation and longitudinal section of the mechanism shown in Fig. 1, the section being taken on the line 2—2 Figs. 4, 5 and 6. Fig. 3, a cross section on the line 3—3 Fig. 2. Fig. 4, a cross section on the line 4—4 Fig. 2. Fig. 5, a cross section on the line 5—5 Fig. 2. Fig. 6, a cross section on the line 6—6 Fig. 2. Fig. 7, a detail of a part of the driving member. Figs. 8 and 9, diagrammatic views to illustrate the flow of the fluid, and Fig. 10, a detail in section on the line 10—10 Fig. 3, and Fig. 11, a detail in perspective to be referred to.

In the embodiment of the invention herein shown, the apparatus is composed of a cylindrical casing or body portion made up of four sections $a$, $b$, $c$, $d$, end disks $e$, $f$, and intermediate disks or partition walls $g$, $h$ and $i$, which subdivide the casing into four compartments or chambers 10, 12, 13 and 14. The sections of the casing are firmly secured together to form a single casing by bolts or rods 15 connecting the end disks $e$, $f$. One of the chambers as 10 contains the driven member, another chamber as 13 the driving member, the chamber 12 between these, the valves for controlling the flow of the oil or other fluid from one chamber to the other, and the chamber 14 the mechanism for operating the valves and controlling the driving member.

The casing has extended into it from its opposite ends two shafts 15, 16, which are disconnected from each other and which may be designated the driving and driven shafts respectively. In the present instance the driving shaft 15 terminates at its inner end within the chamber 13 and is extended outwardly through a substantially long hub 17 on the disk or partition wall $i$, said hub projecting through the end disk $f$. The driven shaft 16 terminates at its inner end in the chamber 10 and extends outwardly through a hub 18 on the end disk $e$. The driving shaft 15 has fastened to its end within the chamber 13, the driving member of the apparatus. The driving member in the present instance is made in the form of a drum, see Figs. 2 and 6, and comprises a hub 20, side walls 21 and a rim portion 22, which latter is provided on its outer surface with preferably a series of pockets, sockets or cavities 23, in which are located a series of wings or arms 24, which are pivoted at one end and have their other end free to swing or move outwardly beyond the circumference of the rim 22 or inwardly into substantially the same circle as the circumference of the said rim. The outer surface of the wings or arms 24 are made of substantially the same curve or circle as the circumference of the rim 22, so that, when the said wings or arms are in what may be termed their contracted position, they practically form part of the circumference of the drum, for a purpose as will be described.

The driving member coöperates with a ring composed of two parts or halves 25, 26 which are movable toward and from each other and are provided at their ends with fingers 27, 28, see Figs. 2, 6 and 7, which interlock and act as guides for the two parts, when the latter are moved toward and from each other. The inner surfaces of the two parts or halves 25, 26 are of the same curvature or circle as the outer circumference of the rim of the driving member, so that, when the said parts or halves are moved toward each other to their innermost position, the inner surfaces form part of the same circle and contact with the outer circumference of the rim 22 of the driving member, and thereby hold the wings 24 in their innermost position and maintain them in this, their inoperative position, until the members or halves of the ring are moved away from each other into what may be termed their eccentric or working position represented in Fig. 6.

When the ring members 25, 26 are moved away from each other, the fingers 27, 28 remain interlocked and portions thereof still form part of the circle having the same center as the rim of the driving member, whereas the remaining portions of the ring members form with the rim of the driving member substantially crescent shaped spaces 29, 30, which are of maximum width at a point 90° from the points of contact of the fingers with the rim of the driving member and decrease to said points of contact as shown in Fig. 6. When the ring members 25, 26 are moved into what may be termed their outer position, shown in Fig. 6, the wings or arms 24 are free to be turned on their pivots by centrifugal force, so that their free ends project beyond the circumference of the rim 22 and act upon the oil or other fluid, which is in front of said wings, in the spaces 29, 30, and as the driving member is revolved in the direction of the arrow 31, Fig. 6, the oil is set in motion and is pushed out of the spaces 29, 30 in front of each of the wings 24.

In the closed or concentric position of the wings 24, the oil is displaced from between the rim and the ring and passes into the space between the two part ring and the casing, as will be described.

To facilitate the outward movement of the wings 24, the bottom walls of the sockets or cavities 23 may be provided with openings 32, through which the oil may pass to assist in moving the wings as will be described.

The outer surfaces of the interlocking fingers 27, 28, are made flat and move on flat bearing surfaces 34, on the inner side of the section $c$ of the casing, and the end walls of the slots between the fingers may be provided with grooves or channels 280, see Fig. 6, which permit the liquid to flow from the spaces 29, 30 to the space 281 between the two part ring and the inner circumference of the casing, when the two parts of the ring are moved into their concentric position. By reference to Fig. 6, it will be seen that as the driving member is rotated, the wings are forced inwardly into their concentric position as they pass in contact with the interlocking fingers, which causes the liquid within the rim to be forced toward the center of the driving member, and this liquid sets in motion another portion of the liquid which moves outwardly toward the rim of the driving member, and this latter portion of the liquid passes through the openings 32 and acts on the wings to force them out into contact with the parts 25, 26 of the ring, which forms an expansible and contractible casing for the driving member.

The oil between the driving member and the expansible ring which is set in motion by the wings or arms 24, acts on the driven member which will now be described.

The driven member, see Figs. 2 and 5, comprises a drum provided with a hub 35, side walls 36 and a rim 37, said rim having extended transversely thereof a plurality of slots having side walls 38, which extend toward the center of the drum and form guides for movable wings or plates 39, which form pistons for the fluid to act against to rotate the drum. The drum is fastened to the driven shaft 16 as by keys 40, and revolves in the chamber 10, whose wall is composed of two circular portions 41, 42, which are eccentric with relation to the center of the shaft 16, and whose ends meet at two diametrically opposite points 43, 44, and are concentric with the drum, so that at these points the circumference of the drum makes contact with the wall of the chamber 10 and forms therewith substantially fluid tight joints. The pistons or wings 39 are designed to have their outer ends in engagement with the wall of the chamber 10, and for this purpose the inner ends of the pistons bear against cam shaped plates 46, 47, which are supported upon annular flanges or rings 48, 49 on the disks $e$, $g$, which form the side walls of the chamber 10, see Fig. 2. The cam plates 46, 47 may be screwed, pinned or otherwise secured to the side walls $e$, $g$, and are interposed between the latter and the side walls 36 of the drum, which latter are offset as represented in Fig. 2. The rim 37 of the drum forms with the eccentric portions 41, 42 of the wall of the chamber 10, two crescent shaped spaces 50, 51, into which the pistons are gradually projected from the points 43, 44 to points substantially at right angles thereto and are then gradually forced back out of said spaces. The drum of the driven member is revolved by the fluid which enters the spaces 50, 51, at one of their narrowest points and acts against the projecting portion of the pistons during substantially a half revolution of the drum, thereby rotating the drum and its shaft 16.

The flow of fluid from the chamber 13 containing the driving member into the chamber 10 containing the driven member and then back to the chamber 13 is controlled by valves 52, 53 located in the chamber 12 between the chambers 10, 13. The disks $g$, $h$ constituting side walls of the chambers 10, 13 are provided on opposite sides of the center of the disks and as herein shown above and below said center, with two sets of ports in each side wall. The upper set of ports in each side wall is composed of two substantially long ports 54, 55, see Fig. 4, and the lower set is composed of two like ports 56, 57. The inner ends of the ports 54, 55, 56, 57 connect the extremities of the crescent-shaped portions of the chambers 10, 13, with the interiors of the cylinders 60, 61, located in the chamber 12, and containing the valves 52, 53, shown as piston valves, each provided with two sets of ports 66, 67, (see Fig. 2), which are brought into register with the inner ends of the ports 54, 55, 56, 57, in order to control the flow of liquid into the chamber 10.

As indicated in Figs. 8 and 9, the ports 66 cross each other and the ports 67 are parallel, so that in one position of the valves the chambers 13, 10 are connected in such manner that the fluid is forced by the driving member into the chamber containing the driven member in such direction as to revolve the driven member and its shaft 16 in what may be termed the forward direction, that is, in the same direction as the driving member, and in the other position of the valves, the driven member and its shaft are rotated in a reverse direction. The position of the valves and the flow of the liquid from one chamber to the other is illustrated diagrammatically in Figs. 8 and 9, in which the chamber 13 is connected by the ports 54, 55, 56, 57 with valve cylinders 60, 61, and the latter connected by a second set of the ports 54, 55, 56, 57, with the chamber 10. In the position shown in Fig. 8, the ports 66 in the valves register with the ports 54, 55, 56, 57, which position corresponds to that shown in Figs. 2 and 4. When the valves 52, 53 are moved to bring the ports 67 in register with the ports 54, 55, 56, 57, the chambers 13, 10 are connected as illustrated in Fig. 9, and the fluid is forced through the chamber 10 in the reverse direction, consequently the shaft 16 is rotated in the reverse direction from that in which it is rotated when the valves are in the position shown in Fig. 4. In both instances it will be noticed that the driving member is not reversed but is rotated continuously in one direction.

It will thus be seen that the course of the fluid through the chamber 10 and the direction of rotation of the driven member and its shaft 16, are determined by the position of the valves 52, 53, which are capable of being moved by the operator as will be described. It will also be seen that the volume or amount of fluid which is set in circulation and becomes effective upon the driven member, is determined by the extent to which the wings 24 of the driving member are allowed to project beyond the circumference of the rim 22 of the driving member, and this is governed by the distance the two halves 25, 26 of the expansible ring are moved off of the center, which is under control of the operator as will be described.

In the present instance, the two halves or parts 25, 26 of the expansible ring are provided with lugs or ears 70, 71, which are engaged by cranks or arms 72, 73 on rock shafts 74, 75 supported by the disks $i$, $h$. The rock shafts 74, 75 within the chambers 13, 14 are located substantially diametrically opposite, see Fig. 3, and have fast on them within the chamber 13 the cranks or arms 72, 73, and within the chamber 14 have fast on them segmental gears 76, 77, which mesh with toothed portions 78, 79 of a mutilated gear 80 of a width substantially equal to the width of the chamber and having its center portion provided with longitudinal slots 81, see Figs. 3, 10 and 11, which form a slotted hub 83 for the said gear, said hub being mounted to turn on the hub 17 attached to the disk $i$. The hub portion 83 of the gear is provided with inclined slots 84 into which extend inclined lugs 85 on keys or arms 86, which slide in slots or ways 87 in the hub 17. It will thus be seen that if the keys 86 are moved longitudinally in one direction, the inclined lugs 85 on the said keys will move in their inclined ways or slots 84 in the hub of the gear 80, and effect rotation of the said gear on the hub 17. When the gear 80 is thus turned, it turns the segmental gears 76, 77 and their shafts 74, 75, and through the cranks 72, 73 and lugs 70, 71 moves the two halves 25, 26 of the ring away from each other and into their eccentric position to form the crescent shaped spaces 29, 30, and thus bring the driving member into operation to effect circulation of the fluid and rotation of the driven member.

Figure 11:
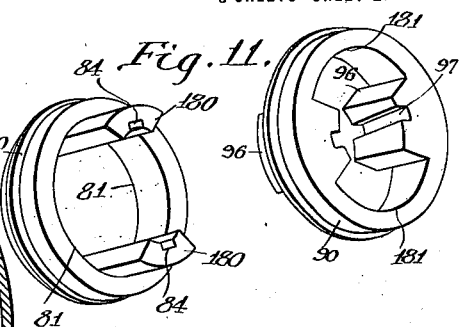
Figure 10:
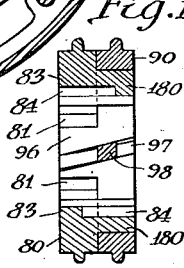

The slotted hub of the gear 80 is extended beyond one face of the gear to form fingers 180, upon which is mounted to turn a second mutilated gear 90, see Figs. 2, 3, 10 and 11, of similar construction as the gear 80, it being provided with a hub portion having axially extended slots 181, and with fingers 96, see Figs. 10 and 11, which project beyond one face of the gear and into the slots 81 in the hub of the gear 80, the fingers 180 of the latter extending into the slots 181 in the hub of the gear 90. The gear 90 is provided with a toothed portion 91, shown in Fig. 3 which meshes with a segmental gear 92 fast on a rock shaft 93, which is extended through the disks $i$, $h$, into the chamber 12 containing the valves 52, 53, wherein it is provided with a crank or arm 94, which is joined by a link 95 to the rocker arm 64. The hub of the gear 90 is provided with inclined slots or ways 97, which extend the length of the fingers 96, and into which project inclined lugs 98 see Fig. 10 on the end of keys 99, (see Fig. 3) which slide in ways or slots 100 in the hub 17 and to which are pinned or otherwise fastened a collar 102 mounted to slide on the hub 17, so that, when the collar 102 is moved longitudinally of the hub 17 in one direction, the keys 99 are slid in their ways 100 and the inclined lugs thereon turn the gear 90, which by means of the segment gear 92, rocks the shaft 93 and through the crank 94 and link 95 moves the rocker arm 64, which in turn moves the valves 52, 53. The hub 17 also has mounted on it to slide thereon a collar 103, which is fastened to the keys 86, and in practice the collars 102, 103 may be operated by levers (not shown) when the apparatus is used in an automobile or other vehicle.

In practice it is designed that the driving and driven members and their inclosing casing should revolve as one piece, when the speed of the driven shaft 16 is the same as the speed of the driving shaft 15, and yet enable the driven shaft 16 to be started from a stationary condition and gradually brought up to the speed of the driving shaft. To this end, the casing is mounted to turn in bearings, preferably ball bearings, 110 in stationary supports 112, which may be secured to the framework of the machine, and has coöperating with it a brake band 113 of known construction, and shown only in section in Fig. 2, which serves to hold the casing stationary, while the driven shaft is being speeded up, and when the said shaft is rotating at the desired speed in unison with the driving shaft, the valves 52, 53 are moved to their neutral position, in which the ports 66, 67 are closed, so that the fluid can no longer circulate, and the brake band is then released, whereupon the driving and driven members and the casing rotate as a unit and the apparatus acts as a clutch to couple the shafts 15, 16 together and also acts as a balance or additional fly wheel for said shafts. When it is desired to reduce the speed of the driven shaft, the valves 52, 53 are opened, and the expansible ring of the driving member is contracted slowly and moved to its concentric position, whereupon the driving member rotates idle, and as it no longer circulates the fluid, the driven member comes to rest. The apparatus herein shown when used on an automobile, takes the place of the usual clutch and change speed gears, thereby effecting a very considerable saving in the cost of construction, and is capable of being controlled by the foot or hand of the operator, which enables the vehicle to be controlled practically by a single lever, for after the lever which controls the valves has been operated to position the same, so as to direct the flow of liquid in a forward or reverse direction in the chamber containing the driven member, this lever is left in the position in which it is placed, and the operator has only to operate the single lever which controls the driving member, and by means of this latter lever he can expand or contract the two part ring and thus control the speed of the vehicle as he desires. The chamber 12 may be provided with a removable cap 130, which can be removed when it is desired to gain access to the valves 52, 53. The chambers 13 and 10 are provided with suitable inlet openings not shown for the admission of the oil or other fluid. It will be observed, that the expansible ring is capable of being contracted while the casing is revolving, and, as a result, the size and capacity of the driving member may be decreased at the will of the operator, so that a material saving in power required to drive the driven member may be effected, or, on the other hand, the full power of the engine or motor may be utilized or applied to the reduced driving member, so as to overcome an abnormal resistance offered to the driven member.

I have herein shown one construction of fluid transmission embodying this invention, but it is not desired to limit the invention to the particular construction shown.

Claims:

1. In an apparatus of the character described, in combination, a driving shaft, a driven shaft, a casing for containing fluid, a rotatable driven member within said casing concentric with said driven shaft and connected thereto and provided with a plurality of radially movable devices for the fluid to act on and effect rotation of said driven member and the driven shaft, a rotatable driving member within said casing concentric to and connected with the driving shaft and provided with a plurality of movable devices to effect movement of said fluid, and expansible and contractible means located in said casing and coöperating with the movable devices of said driving member to render them ineffective upon said fluid, and to permit them to become effective thereon.

2. In an apparatus of the character described, in combination, a driving shaft, a driven shaft, a casing for containing fluid, a rotatable driven member within said casing concentric with said driven shaft and connected thereto and provided with a plurality of movable devices for the fluid to act on and effect rotation of said driven member and the driven shaft, a rotatable driving member within said casing concentric with the driving shaft and connected thereto and provided with a plurality of movable devices to effect movement of said fluid, expansible and contractible means coöperating with the movable devices of said driving member to render them ineffective upon said fluid and to permit them to become effective thereon, and means for controlling the direction of movement of the fluid to enable the latter to rotate the driven member in opposite directions.

3. In an apparatus of the character described, in combination, a driving shaft, a driven shaft, a casing for containing a fluid, a rotatable driven member within said casing concentric with said driven shaft and connected thereto and actuated by said fluid to effect rotation of said driven shaft, a rotatable driving member within said casing concentric with said driving shaft and connected therewith to be rotated thereby, and expansible and contractible means within said casing and coöperating with said driving member to permit the same to become effective on said fluid to cause the latter to act on the driven member, and to render said driving member ineffective upon said fluid.

4. In an apparatus of the character described, in combination, a driving shaft, a driven shaft, a rotatable driven member concentric with said driven shaft and connected thereto, a rotatable driving member concentric with said driving shaft and connected thereto, a rotatable casing for containing a body of fluid coöperating with said driving and driven members to enable said fluid to be set in motion by said driving member and actuate said driven member to rotate the same, means within said casing for controlling the action of said driving member on said fluid, and means for holding said casing from rotating while the fluid is being circulated by said driving member to effect rotation of said driven member.

5. In an apparatus of the character described, in combination, a rotatable casing for containing a fluid, a driving member located in said casing and capable of being expanded and contracted, means rotatable with said casing for contracting said driving member, and a driven member located within said rotatable casing and actuated by said fluid.

6. In an apparatus of the character described, a driving member comprising a drum having a device capable of being moved beyond the circumference of the drum, and an expansible and contractible ring movable with relation to said drum from a position substantially concentric therewith to a position eccentric thereto, said ring in its concentric position coöperating with the device carried by the drum so that the said device is substantially concentric with the drum, and in its eccentric position forming with said drum substantially crescent shaped spaces into which the said device is capable of being moved, a cylindrical casing containing said parts and capable of being rotated, and means within said casing and carried thereby for moving said ring while said casing is rotating.

7. In an apparatus of the character described, in combination, a driven member, a driving member, one of which is capable of being expanded and contracted, a casing containing a body of fluid and in which said members are located to enable said fluid to be set in motion by said driving member and actuate said driven member, means for expanding and contracting the expansible member, and a valve within said casing between said driving and driven members for controlling the circulation of the said fluid to cause the driving member to actuate the driven member and to interrupt said circulation and cause the casing to revolve with said members.

8. In an apparatus of the character described, in combination, a rotatable driven member, a rotatable driving member, a rotatable casing in which said members are located and containing a body of fluid coöperating with said members to enable said fluid to be set in motion by said rotatable driving member and actuate said rotatable driven member, and expansible and contractible means for controlling and varying the action of said rotatable driving member on said fluid to drive the driven member at varying speeds, and means for holding said casing from rotating while the fluid is being circulated by the rotatable driving member to effect rotation of said driven member.

9. In an apparatus of the character described, in combination, a casing for containing a fluid, means for forming chambers within said casing, one of said chambers having its inner circumference provided with eccentric circumferential walls, a driven shaft extended into the chamber having the eccentric walls, a drum fast on said shaft and provided with substantially radial slots, devices movable in said slots and coöperating with the said eccentric walls, means coöperating with said devices to keep them in engagement with the circumferential wall of the chamber in which the said drum is located, a driving shaft extended into another of said chambers, a drum concentric on said driving shaft and provided with movable devices, an expansible and contractible ring coöperating with the movable devices of the drum fast on said driving shaft, and means within the casing and between said chambers to control the circulation of fluid through said chambers, substantially as described.

10. In an apparatus of the character described, in combination, a unitary rotatable fluid driven member, a unitary rotatable fluid driving member, a rotatable casing within which said members are located and which contains a body of fluid, means for holding said casing stationary to permit the said rotatable driving member to circulate the said fluid and cause it to act on the said driven member to rotate the same, means for interrupting the circulation of said fluid to cause the casing to rotate in unison with the said driving and driven members, and means for controlling the action of the said rotatable driving member on said fluid both while the casing is stationary and while it is being rotated.

11. In an apparatus of the character described, in combination, a driving shaft, a driven shaft, a rotatable casing for containing a fluid into which said shafts are extended, an expansible and contractible driving member mounted upon said driving shaft within the said casing, an expansible and contractible ring within said casing and coöperating with the said driving member, means within said casing for effecting movement of said expansible and contractible ring, a driven member located in said casing and actuated by said fluid, and means for holding said casing from rotating to permit the said fluid to be circulated by said driving member and thereby drive the driven member, and means to interrupt said circulation to permit the casing to be rotated in unison with said driving and driven shafts.

In testimony whereof, I have signed my name to this specification in the presence of two subscribing witnesses.

FREDERICK O. KILGORE.

Witnesses:
JAS. H. CHURCHILL,
J. MURPHY.